United States Patent [19]

Yoshida

[11] Patent Number: 4,643,664
[45] Date of Patent: Feb. 17, 1987

[54] POINTED HEAT-GENERATING DEVICE FOR MOLDS OF INJECTION MOLDING MACHINES

[75] Inventor: Yoshiichi Yoshida, Yonezawa, Japan

[73] Assignees: Shigeru Tsutsumi; Seiko Engineering and Research Co. Ltd., both of Yamagata, Japan

[21] Appl. No.: 676,582

[22] Filed: Nov. 30, 1984

Related U.S. Application Data

[63] Continuation of Ser. No. 275,230, Jun. 19, 1981, Pat. No. 4,516,927.

[30] Foreign Application Priority Data

Jun. 25, 1980 [JP] Japan .................................. 55-88001

[51] Int. Cl.⁴ ............................................ B29C 45/20
[52] U.S. Cl. ................................. 425/549; 264/328.15; 425/568
[58] Field of Search ............. 264/328.15, 328.8, 328.6; 425/144, 378 R, 379 R, 548, 547, 549, 568, 570

[56] References Cited

U.S. PATENT DOCUMENTS

| 3,800,027 | 3/1974 | Tsutsumi | 425/549 |
| 4,309,163 | 1/1982 | Cottancin | 425/549 |
| 4,318,686 | 3/1982 | Morgan | 425/549 |

FOREIGN PATENT DOCUMENTS 55-631  5/1981  Japan .

Primary Examiner—Tim Miles
Assistant Examiner—Timothy W. Heitbrink
Attorney, Agent, or Firm—Michael J. Striker

[57] ABSTRACT

A pointed heat-generating device for molds of injection molding machines comprises a heat-generating body with a conical portion at its front end, a disc-shaped flange at its rear end, a metal casing therebetween, a plurality of first passages in the metal casing for passing a focused resin therethrough, and a plurality of second passage in said flange and communicating with the first passages.

5 Claims, 10 Drawing Figures

POINTED HEAT-GENERATING DEVICE FOR MOLDS OF INJECTION MOLDING MACHINES

This is a continuation of application Ser. No. 275,230, filed June 19, 1961, now U.S. Pat. No. 4,516,927.

BACKGROUND OF THE INVENTION

The invention relates to a pointed heat-generating device for molds of injection molding machines.

The pointed heat-generating device is used widely for runnerless injection molding machines in order to fuse instantaneously synthetic resin existing at an injection gate communicating to a cavity of the molds, to open the injection gate and to inject the fused synthetic resin into the cavity.

A conventional pointed heat-generating device for molds of injection molding machines is disclosed in Japanese Pat. No. 902601, the corresponding U.S. Pat. No. 3,800,027, U.K. Pat. No. 1,382,800, German Pat. No. 2207001, French Pat. No. 72 05. 125, etc.

The above conventional heat-generating device is provided at its pointed end with such a heat-generating wire as a nichrome wire, wherein the heat-generating wire is generated intermittently in synchronization with an injection molding cycle. When carrying out an injection molding of glass fiber containing synthetic resins in accordance with this process, the heat-generating wire is inclined to be worn. Further, there exists a twice-folded nichrome wire as a heat-generating member in order to reinforce its wear resistance. However, the heat-generating effect of the twice-folded nichrome wire is inferior to the aforementioned normal one.

For the purpose of eliminating the disadvantages of the prior art, the inventor of the present Patent Application invented a pointed heat-generating device shown in FIG. 1. It is disclosed in Japanese Unexamined Utility Model Publication No. 56-55631 (corresponding to Japanese Utility Model Application No. 54-136755) which was laid open for public inspection on May 14, 1981.

In FIG. 1, there is mounted a coiled heat-generating means II within a pointed section Ia of a heat-generating device I. Its heat generation is quite sufficient and its wear resistance is also improved. Nevertheless, the pointed section Ia is large at size and the heat-generating device I itself is elongated. Accordingly, a heating response due to the increase of heat capacity and a cooling response due to a switching operation are not carried out suitably.

BRIEF SUMMARY OF THE INVENTION

It is an object of this invention to provide a pointed heat-generating device for molds of injection molding machines, whereby particularly precise parts can be molded. The pointed heat-generating device in accordance with the invention includes a metal casing, a pointed heat-generating means fixed with the metal casing and a gate communicated to a cavity of the molds, and is improved in that a heat-generating wire is penetrated wholly into a passage which is bored in a non-processed cylindrical material and an alloy portion is formed in an inert gas between an end of the heat-generating wire and the non-processed cylindrical material, thereby the alloy portion being formed as a pointed part of the heat-generating means by machining. The pointed heat-generating means has an excellent wear resistance. Further, it is small-size and its heat capacity is lesser. Accordingly, a heating and cooling process of synthetic resin at the gate can be carried out speedily.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

PREFERRED EMBODIMENTS OF THE INVENTION

Figure 1:
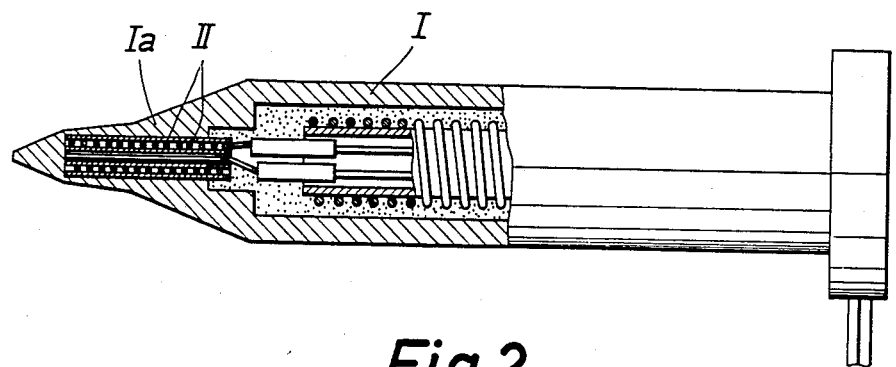
FIG. 1 is a partially cutaway front view of a conventional pointed heat-generating device for molds of injection molding machines.
Figure 2:
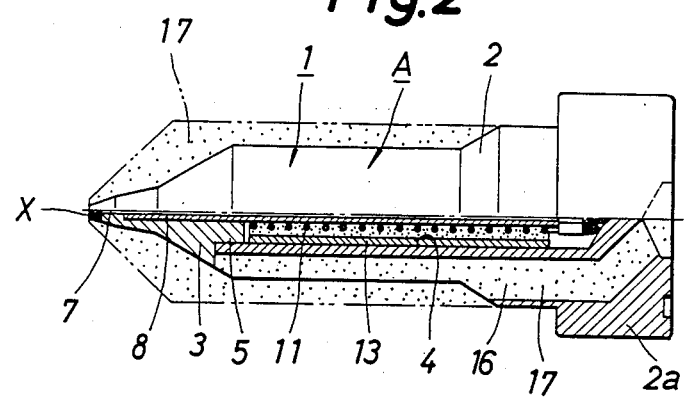
FIG. 2 is a partially cutaway transverse section view of an example of a pointed heat-generating device for molds of injection molding machines according to this invention.
Figure 3:
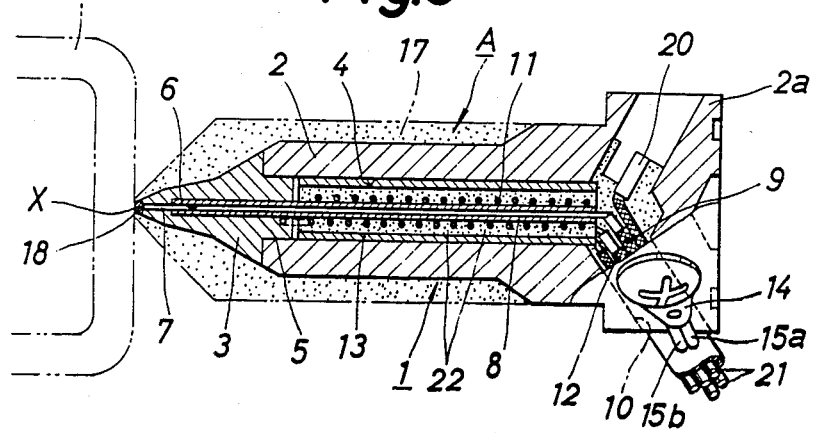
FIG. 3 is a partially cutaway longitudinal section view of the device in FIG. 2.
Figure 4:
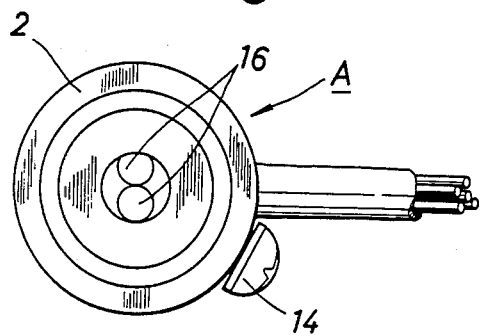
FIG. 4 is a right side view of the device in FIG. 2.

A first example of this invention will be described with reference to FIGS. 2 to 6.

A heat-genearing device A comprises a body 1, a metal casing 2 having a base 2a, and a pointed heat-generating means 3. The device A is of a projectile shape as a whole. The metal casing 2 is made of such a heat-proof metal as e.g. stainless steel. It has a cylindrical inner wall 4. The heat-generating means 3 is pointed and nearly conical. It is provided, at its rear end, with a cylindrical fitting portion 5 for receiving and fitting the metal casing 2. A passage 6 exceeds in an axial direction of the heat-generating means 3. A heat-generating wire 7 such as e.g. a nichrome wire is penetrated wholly into the passage 6 until its end reaches a pointed end of the heat generating means 3. An end portion of the heat-generating means 3 forms an alloy portion X of wear resistance which is nearly equivalent to that of a material of the heat-generating means 3.

How to make the alloy portion X will now be described. As shown in a dot-and-dash line of FIG. 5. there is a non-processed cylindrical material 3a.

First of all, the passage 6 is bored in the non-processed cylindrical material 3a, and the heat-generating wire 7 is penetrated into the passage 6. An end of the non-processed cylindrical material 3a and an end of the heat-generating wire 7 are fused locally and united to each other in such an inert gas as argon and converted into an integral part, that is the alloy portion X by means of arcing.

Thus, the alloy portion X has the nearly same wear resistant property as the heat-generating means 3. By cutting and processing the cylindrical material 3a, there is formed the pointed heat-generating means 3 having the alloy portion X as a peak. As a result, the heat-generating means 3 becomes small size and its heat capacity becomes lesser.

The heat-generating wire 7 is extended to the cylindrical inner wall 4 and covered by e.g. an alumina insulating tube 8 which is inserted into the enlarged passage 6. Since heat conductivity of the heat-generating wire 7 is secured sufficiently, the pointed part of the heat-generating portion 3 maintains a sufficient heating effect by way of the heat-generating wire 7. Another end of the wire 7 is connected to a lead wire 9 located at an end of the alumina tube 8 and connected to an outside circuit by way of a guiding opening 10 provided at a rear end of the metal casing 2.

On the other hand, an exterior of the alumina tube 8 is coiled by a second heat-generating wire 11. One end of the second heat-generating wire 11 is connected to the fitting portion 5, while the other end thereof is connected to a lead wire 12 by way of the guiding opening 10.

Further, the second heat-generating wire 11 is electrically insulated by a second alumina tube 13 fitted on the inner wall 4, but it maintains a sufficient heat conductivity. The first and second heat-generating wires 7 and 11 respectively are connected to the pointed heat-generating means 3 and the metal casing 2. A rear end of the metal casing 2 is provided with a terminal 14 which connected to two lead wires 15a, 15b. They are connected to an outside circuit through the guiding opening 10.

Numeral 16 is a pair of supply paths for supplying synthetic resin which are mounted in parallel with each other to an axial direction of the metal casing 2. Numeral 17 is synthetic resin. Numeral 18 is an injection gate. Numeral 19 is a cavity. Numeral 20 is a temperature senser. Numeral 21 is a lead wire for the temperature senser 21. Numeral 22 is an insulating material such as magnesium hydroxide which is filled within the metal casing.

A function of the pointed heat-generating device according to the first example will be described. A joule heat of the heat-generating wire 11 which is generated by energizing is conducted to the insulating tube 13 and the metal casing 2 one after another. As a result, the synthetic resin covering the metal casing 2 as well as the pointed heat-generating means 3, and the synthetic resin supplied in the supply paths 16 are all fused. As described previously, since the pointed part of the heat-generating means 3 and the heat-generating wire 7 form an integral structure, that is the alloy portion X, it has excellent rigidity and wear resistance. Accordingly, the alloy portion X is formed small at size and its heat capacity becomes lesser.

Further, the pointed heat-generating device of the invention can be used effectively for such a narrowed gate 18. By turning off a power source to the heat-generating wire 7, the fused synthetic resin is cooled immediately and solidified. Conversely, by turning on the power source, it is heated immediately and fused. Due to an ON-OFF switching of the power source, the synthetic resin 17 at the gate 18 is fused or solidified, in response to which the gate 18 is opened or closed. Thus, a very accurate injection molding is feasible.

A second example of this invention will now be described with reference to FIGS. 7 to 10. When the numerals in the second example are the same ones as the first example, their description will be omitted.

The metal casing 2 is provided with a stage 23 adjacent the base 2a. The stage 23 is provided with a pair of slit grooves 24 at its upper side and lower side in order to ease a cooling effect of a mold cooling water, while the winding number of the second heat-generating wire 11 is increased in the proximity of the stage 23 for the same purpose. Thus, by raising locally the temperature of heat generation, it is possible to ease the cooling effect of the cooling water.

Numeral 25 is a protective tube for protecting the lead wires, the protective tube 25 being fixed with walls of the guiding opening 10. An end of the protective tube 25 is fixed with a coil spring 26.

Figure 5:
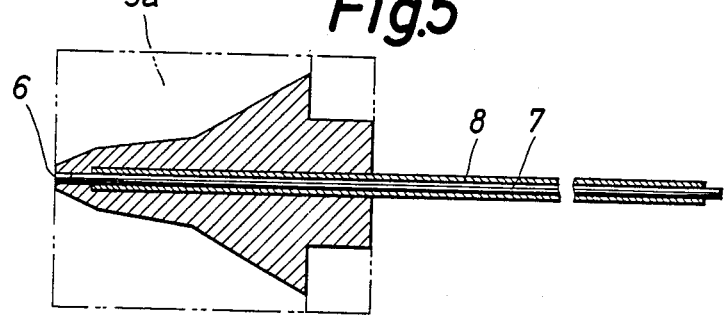
FIG. 5 is a view of a heat-generating wire inserted in a passage bored in a non-processed cylindrical material.
Figure 6:
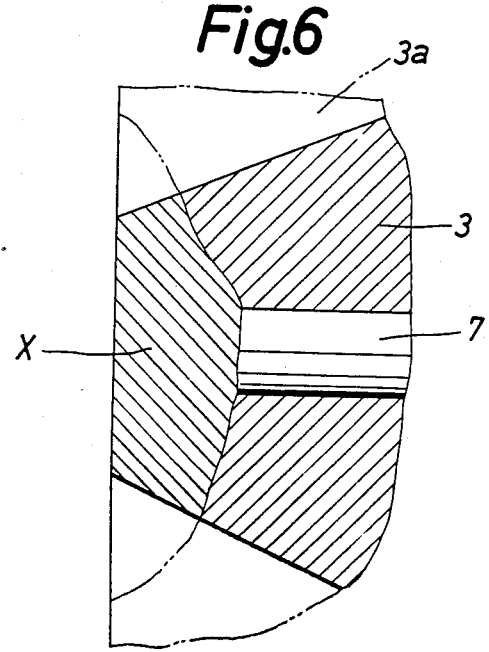
FIG. 6 is an enlarged section view of an alloy portion formed as a pointed part of the device according to this invention.
Figure 7:
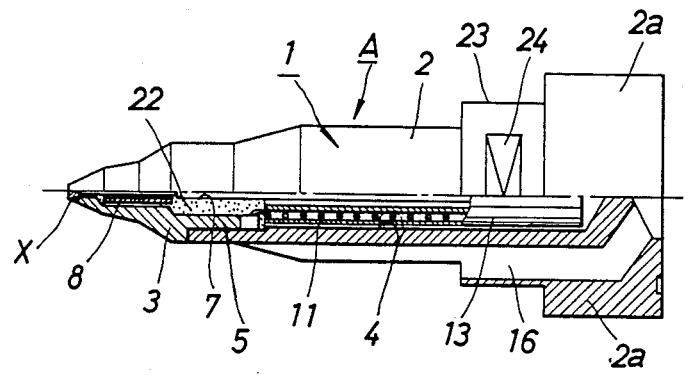
FIG. 7 is a partially cutaway transverse section view of other example of the pointed heat-generating device according to this invention.
Figure 8:
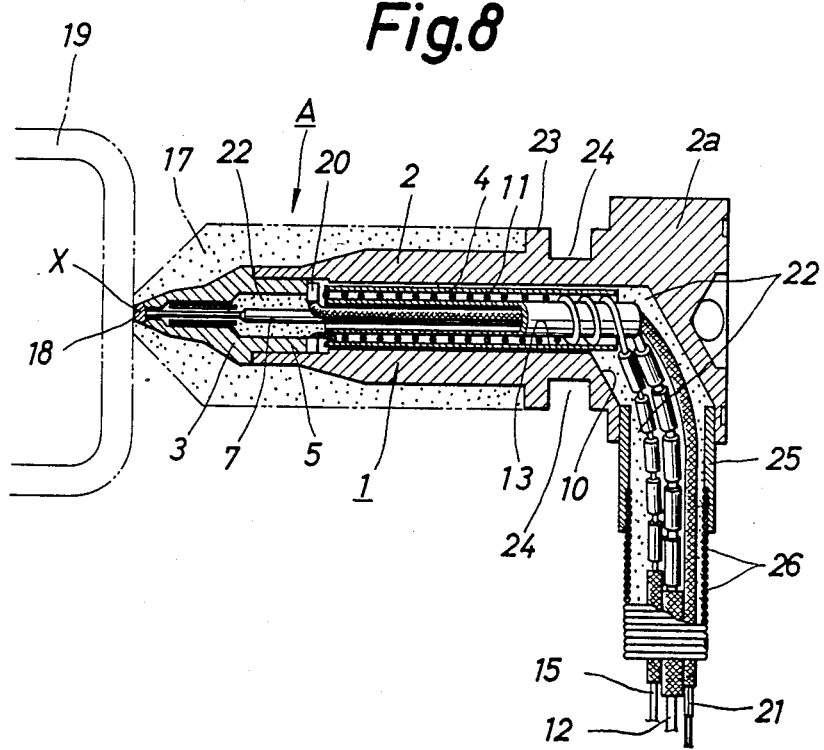
FIG. 8 is a partially cutaway longitudinal section view of the device in FIG. 7.
Figure 9:
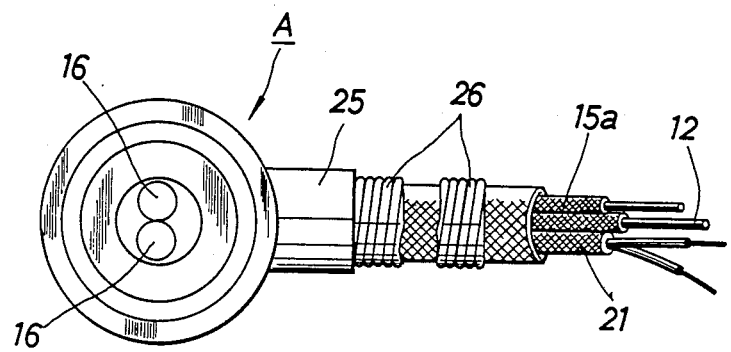
FIG. 9 is a right side view of the device in FIG. 8.
Figure 10:
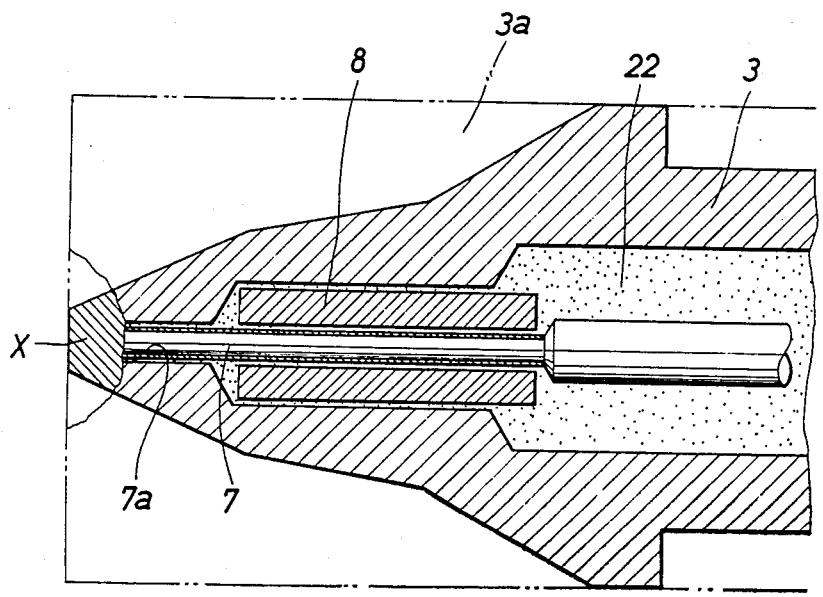
FIG. 10 is an enlarged section view of the pointed heat-generating means in the above example.

The alloy portion X shown in FIG. 10 is basically formed in the same manner as shown in FIG. 5. In the second example a shorter insulating tube 8 is used and an oxide layer 7a coats an exterior of the pointed part of the heat-generating wire 7 in order to enhance insulation thereof furthermore.

Further, by mounting the senser 20 at an end of the heat-generating means 3, it is possible to control the temperature in the proximity of the heat-generating means 3. In this example, only four lead wires are used.

According to one aspect of this invention, the alloy portion formed at the pointed part of the heat-generating means has an excellent wear resistance for flow of the fused synthetic resin, particularly a fused fiber-containing synthetic resin. And durability of the heat-generating means is extended remarkably. Further, since the alloy portion is formed at a small size by accurate cutting and processing, it is very suitable for molding precise plastic products. Further, since the heat capacity of the heat-generating means becomes lesser, the synthetic resin at the injection gate may be heated or cooled speedily.

It will be understood that each of the elements described above, or two or more together, may also find a useful application in other types of constructions differing from the types described above.

While the invention has been illustrated and described as embodied in a pointed heat-generating device for molds of injection molding machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pointed heat-generating device for molds of injection molding machines, comprising
   a heat-generating body having an axis, and a front end and a rear end;
   a conical portion formed at said front end of said body;
   a disc-shaped flange arranged at said rear end of said body;

a cylindrical metal casing extending between said conical portion and said disc-shaped flange of said body;

a plurality of first passages extending axially inside said cylindrical metal casing for passing a fused resin therethrough; and a plurality of second passages extending inside said disc-shaped flange and communicating with said first passages.

2. A pointed heat-generating device as defined in claim 1, wherein said first passages extending inside said cylindrical metal casing are concave.

3. A pointed heat-generating device as defined in claim 1, wherein said cylindrical metal casing and said disc-shaped flange are of one-piece with one another and together form a one-piece element, said first passages and said second passages being arranged inside said one-piece element.

4. A pointed heat-generating device for molds of injection molding machines, comprising a heat-generating body having an axis, and a front end and a rear end;

a conical portion formed at said front end of said body;

a disc-shaped flange arranged at said rear end of said body;

a cylindrical metal casing extending between said conical portion and said disc-shaped flange of said body;

a plurality of first passages extending inside said cylindrical metal casing for passing a fused resin therethrough, said first passages being concave and extending in an axial direction; and a plurality of second passages extending inside said disc-shaped flange and communicating with said first passages, said second passages extending inclinedly relative to said axis.

5. A pointed heat-generating device as defined in claim 4, wherein said cylindrical metal casing and said disc-shaped flange are of one-piece with one another.

* * * * *